Feb. 8, 1966  D. J. HART ETAL  3,233,506
LINEAR MEASURING DEVICE FOR ANNULAR IMAGE
Filed Dec. 14, 1962  2 Sheets-Sheet 1
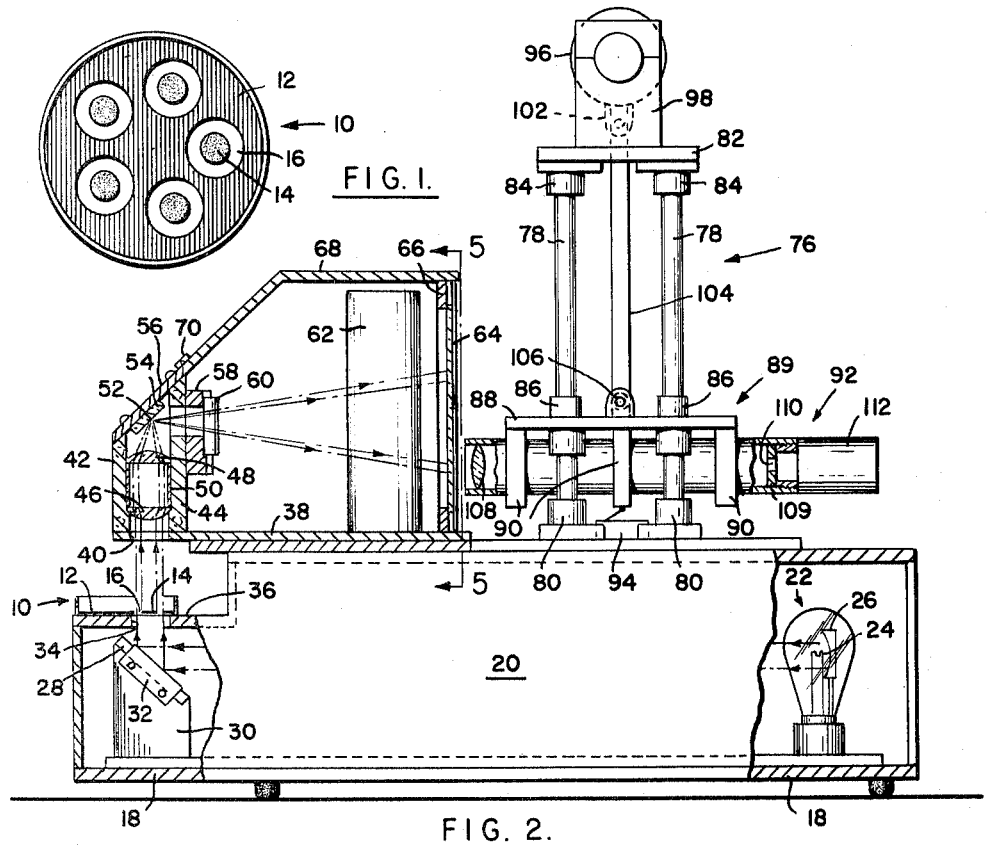
FIG. 1.
FIG. 2.
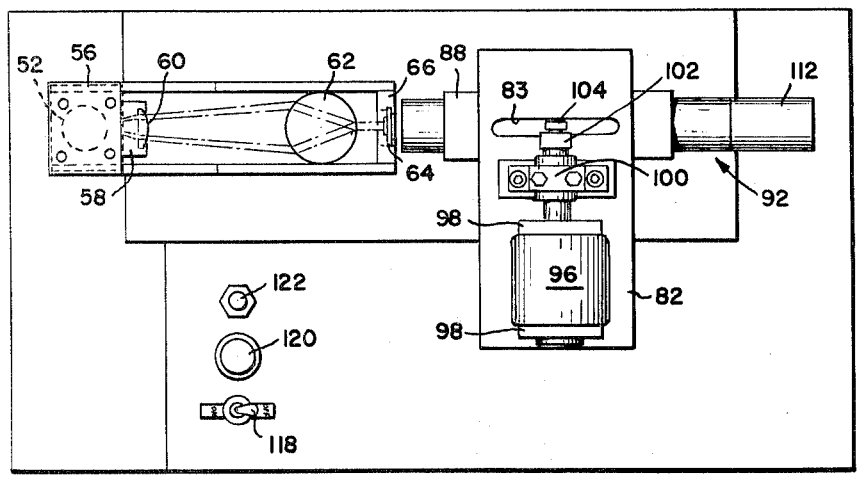
FIG. 3.
INVENTORS
DONALD J. HART &
JOSEPH JAFFE
BY
Busser, Smith & Harding
ATTORNEYS Feb. 8, 1966     D. J. HART ETAL     3,233,506
LINEAR MEASURING DEVICE FOR ANNULAR IMAGE
Filed Dec. 14, 1962     2 Sheets-Sheet 2
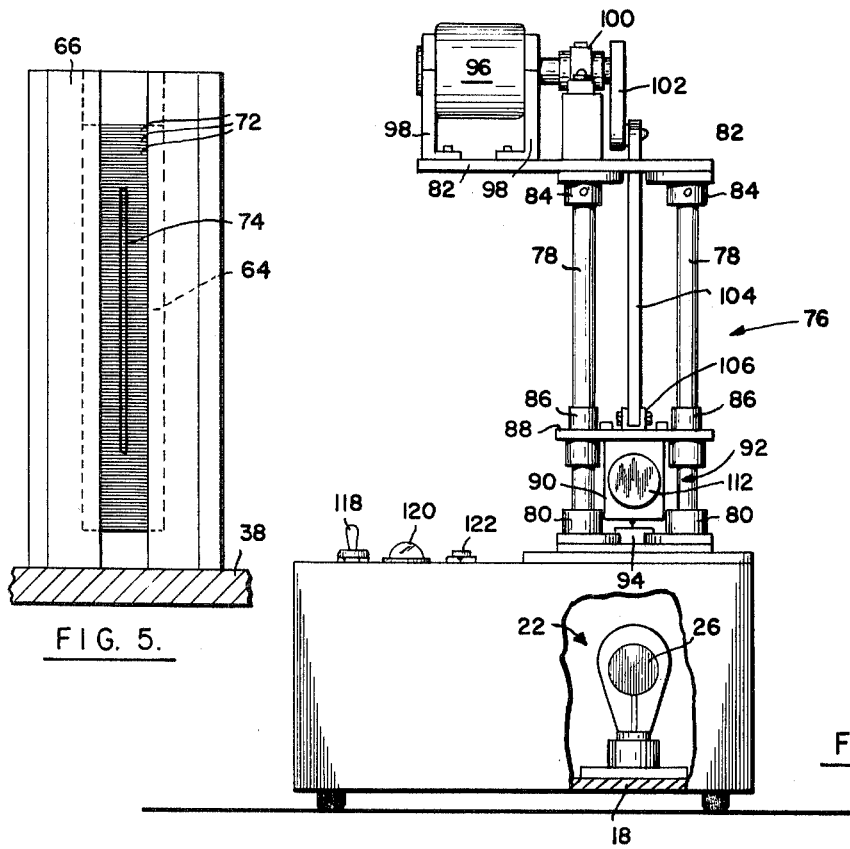
FIG. 5.
FIG. 4.
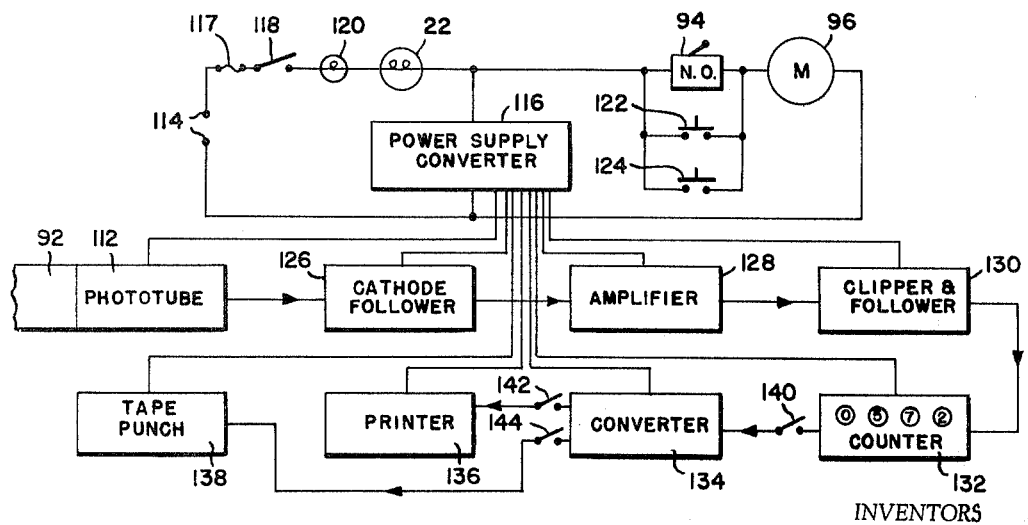
FIG. 6.
INVENTORS
DONALD J. HART &
BY   JOSEPH JAFFE
Busser, Smith & Harding
ATTORNEYS United States Patent Office 3,233,506
Patented Feb. 8, 1966

3,233,506
LINEAR MEASURING DEVICE FOR
ANNULAR IMAGE
Donald J. Hart, Merion, and Joseph Jaffe, Gladwyne, Pa.,
assignors to Smith Kline & French Laboratories, Philadelphia, Pa., a corporation of Pennsylvania
Filed Dec. 14, 1962, Ser. No. 244,727
6 Claims. (Cl. 88—14)

This invention relates to an automated measuring device particularly adapted to rapidly and accurately measure the size of so-called "zones of inhibition" which are produced during laboratory tests of the effectiveness of an antibiotic.

In the field of antibiotic testing, it is conventional practice to place a small amount of a given antibiotic on the surface of an agar plate in a petri dish which has been seeded with selected micro-organisms so as to form a culture. After the passage of a given amount of time, it is then necessary to measure the zone of inhibition which the antibiotic has produced in the culture.

In this field, it is conventional practice to manually measure each zone of inhibition and it will be readily apparent that such manual measurements are exceptionally time consuming due to the fact that hundreds of such cultures involving various concentrations of antibiotic strength on various species of micro-organisms must be measured in order to arrive at a substantially accurate indication of the antibiotic effectiveness. Although prior attempts have been made to design systems for facilitating such measurements, prior systems have been exceedingly complex and prohibitively expensive. In addition, prior systems have not been compatible with automatic read-out instruments which are most desirable for producing the multiple measurements in any one of a number of selected forms.

It is therefore a general object of the present invention to provide a simplified and relatively inexpensive device for measuring a large number of such zones of inhibition in a more fully automatic manner than has been heretofore possible.

It is a further object of the present invention to provide an improved electro-optical system which is fully compatible with conventional read-out instruments so as to provide a completely integrated system for rapidly measuring and reading out the measurements in a plurality of selectable forms.

It is yet another object of the present invention to provide a device for making microbiological measurements which may be readily operated by totally unskilled persons while, at the same time, being capable of producing measurements at a faster rate and of greater accuracy than those previously possible.

These objects, as well as others relating to the particular details of construction and operation, will become more clearly apparent from the following description taken in conjunction with the accompanying drawings wherein:

FIGURE 1 is a top plan view of a petri dish containing a plurality of zones of inhibition to be measured;

FIGURE 2 is a side elevational view of the measuring device with portions thereof shown in section;

FIGURE 3 is a top plan view of the measuring device with the cover portion removed;

FIGURE 4 is a rear elevational view of the measuring device;

FIGURE 5 is a partly sectional view taken along the plane indicated by line 5—5 in FIGURE 1; and FIGURE 6 is a schematic diagram of the electrical components comprising the complete measuring and read-out system.

Referring first to FIGURES 1 and 2, numeral 10 indicates a petri dish composed of glass or plastic or other translucent material. According to the conventional practice, the upper surface of the bottom of the dish is covered with an agar layer 12 which has been seeded with selected micro-organisms. A plurality of filter paper discs 14 which have been soaked with the antibiotic to be tested are then placed on top of the agar layer and the cultures are allowed to grow for a given amount of time. As the bacteria multiply, area 12 becomes relatively opaque, however, the areas 16 immediately surrounding each of the discs remain relatively clear and translucent due to the fact that the multiplication of the bacteria in these areas is inhibited by the presence of the antibiotic contained in the discs. Thus, the areas 16 are the so-called zones of inhibition and the diameters thereof provide an indication of the effectiveness of the particular antibiotic with respect to the selected bacteria. Of course, the filter paper discs are also relatively opaque so that the zones 16 are of annular configuration and it is the outer diameters of these annular zones which are to be measured.

Referring now to FIGURE 2, the measuring device includes a base member 18 which supports an enclosed housing 20 within which there is located a projection lamp generally designated 22 which includes a filament 24 and a reflector 26. Of course, it will be understood that other types of light sources may be employed in practicing the invention so long as the source provides a beam of light having a sufficiently high and uniform intensity so as to pass through and evenly illuminate the zones 16 relative to discs 14 and surrounding area 12. To this end, the preferred embodiment employs a projector lamp 22 positioned at the extreme right-hand or rear portion of housing 20 and a reflecting mirror 28 positioned at the front or extreme left-hand portion as viewed in FIGURE 2. Mirror 28 is supported by a stand 30 having removable brackets 32 and the mirror is centered beneath aperture 34 in shelf 36 at a 45 degree angle such that a collimated light beam is reflected upwardly through aperture 34, the petri dish and through one translucent zone 16 of one of the cultures.

Above the petri dish, there is mounted an optical assembly including an overhanging base plate 38 having an aperture 40 aligned with aperture 34 in shelf 36. The optical assembly further includes a pair of support members 42 and 44 rigidly securing a pair of projecting lenses 46 and 48 spaced by a cylinder 50. The curvature and spacing of lenses 46 and 48 are preferably selected so as to have a principal focal point at 52. A second mirror 54 secured to a plate 56 is located at the focal point 52 and positioned at a 45 degree angle so as to reflect the image laterally through an aperture in support member 44. Member 44 also mounts an apertured bracket 58 supporting a lens 60 which is a vertical section of a cylindrical lens and the optical train or assembly further includes a cylindrical lens 62 resting on base plate 38 through which the image is projected onto a translucent slide 64. Slide 64 is mounted in a rectangular aperture in rear wall 66 and the slide contains a plurality of closely spaced, horizontal lines 72 as shown in FIGURE 5. These lines are non-translucent and preferably number in the order of two hundred per inch. It will also be noted that a cover 68 is hinged to plate 56 by a hinge 70 so that access may be gained to the optical train particularly for the purpose of adjusting the lateral position of cylindrical lens 62.

The geometry of the light path through the above described optical train will now be set forth in detail. First, it will be readily understood that lamp 22 provides a collimated beam of light which is reflected by mirror 28 and which is of sufficient intensity to pass through the relatively transparent zone of inhibition 16. On the other hand, the beam is substantially blocked by the relatively non-transparent area 12 and the filter paper disc 14 so that the beam received by lenses 46 and 48 is annular in crosssection. The annular beam is then projected onto mirror 54 and reflected therefrom as a diverging, annular beam the angle of divergence of which is determined by projecting lenses 46 and 48. The beam then passes through sectional-cylindrical lens 60 and cylindrical lens 62 which have substantially no effect upon the divergence of the beam in the vertical plane as illustrated in FIGURE 2. However, in the horizontal plane shown in FIGURE 3, the angle of divergence is decreased by lens 60 and reversed by lens 62 so that the image projected on slide 64, illustrated in FIGURE 5, is in the form of a solid, vertical band of light 74 the vertical length of which remains directly proportional to the outer diameter of the zone 16. Of course, the length of the light band 74 is several times greater than the actual diameter of zone 16 due to the divergence of the beam in the vertical plane between the focal point and the location of slide 64. Preferably, the distance is selected such that light band 74 is three times the actual diameter of the zone 16 although other powers of magnification are obviously possible. In brief, the total effect of the optical train is to convert the annular image of the zone of inhibition into an enlarged band of light which is then divided into extremely small increments of light by non-transparent lines 72. The number of such increments of light is obviously dependent upon the vertical length of the light band which is a known function of the zone diameter so that, by counting the number of increments, the size of the zone of inhibition may be accurately measured.

This counting function is performed by a light-sensitive scanning assembly 76 which includes four vertical rods 78 the lower ends of which are rigidly secured in flanged sockets 80 secured to housing 20. The upper ends of rods 78 are rigidly secured to a platform member 82 by means such as flanged sockets 84 bolted or otherwise secured to the platform. Rods 78 extend vertically through four precision bearings 86 secured to a transverse plate 88 comprising a portion of carriage 89. The carriage further includes a plurality of depending blocks 90 having horizontally aligned apertures which receive and secure a scanning tube 92 so that the carriage and scanning tube are capable of vertical sliding movement along rods 78. A normally open switch 94 is rigidly secured to the top of housing 20 and is adopted to be engaged and held open by the lower surface of the center block 90 so long as the carriage assembly is in its lowermost position as shown in FIGURES 2 and 4.

At the upper end of the scanning assembly, platform member 82 supports an electric motor 96 which may be mounted in suitable brackets 98 such that the output shaft of the motor extends horizontally through a bearing 100 also mounted on the platform 82. On the other side of bearing, the motor shaft is rigidly secured to crank arm 102 the free end of which is pivotally connected to the upper end of a connecting rod 104. The connecting rod extends through an enlarged slot 83 in the platform member 82 and the lower end thereof is pivotally secured to the carriage assembly at 106.

From the foregoing description it will be apparent that, upon energization of the motor and rotary movement of crank arm 102, the carriage assembly including plate 88, bushings 86, blocks 90 and tube 92 will be vertically raised and lowered once for each revolution of the crank arm so that the vertical light band 74 and the increments thereof may be scanned by scanning tube 92.

As most clearly shown in FIGURE 2, the left end of tube 92 contains a lens 108 and the right end of the tube contains a vertical partition 109 having a horizontal slit 110. The curvature of lens 108 and the distance between this lens and slit 110 are chosen such that one increment of light bounded by a pair of non-translucent lines 72 is focused on the slit at any one vertical position of the tube. Thus, as tube 92 is raised, successive increments of the light band are projected through slit 110. The interior surface of tube 92 is threaded immediately to the left of partition 109 as viewed in FIGURE 2 so as to threadedly receive a light-sensitive phototube 112 which is carried by and forms an integral portion of the scanning tube.

Reference is now made to FIGURE 6 which illustrates the circuitry for actuating the above described components and which further illustrates the complete system when integrated with a plurality of read-out instruments. Numeral 114 designates the input power terminals which may be connected to conventional line current or to other standard power sources. Depending upon the selected power source to which terminals 114 are connected, a power supply convertor 116 will ordinarily be necessary in order to supply the proper power to the various components of the system although it will be readily understood that individual power supplies may be employed in the alternative. A fuse 117 and a master on-off switch 118 are provided between the power input terminals 114 and the power convertor 116, switch 118 preferably being a toggle switch as shown in FIGURE 3. A warning light 120 and the projector lamp 22 are also connected in series with switch 118 so that, upon closure of the switch, both lamps and the power supply convertor are activated. On the other hand, closure of switch 118 does not activate motor 96 since the motor remains deenergized due to switch 94 which remains open so long as the switch is engaged by center block 90 of carriage 89 which is initially in its lowermost position as illustrated in FIGURES 2 and 4. In order to energize the motor, a pair of momentary closure switches 122 and 124 are connected in parallel across normally open switch 94. Switch 122 is a finger actuated, push-button switch mounted on the top of housing 20 as illustrated in FIGURE 3. Switch 124 is an additional switch which may be foot-operated so as to leave the operator's hands completely free for more rapidly adjusting the position of the cultures as will be subsequently described.

With the exception of the previously mentioned phototube 112, the remainder of the components illustrated in FIGURE 6 form the read-out portion of the system, each of these components being conventional and well known so that a detailed description of each is not necessary. These components include a cathode follower 126 which receives the output signals from phototube 112 and produces output signals in phase therewith so as to provide impedance matching between the phototube and an amplifier 128. The signals are then amplified in amplifier 128 and supplied to a clipper and second cathode follower 130 which shapes the signals so as to provide relatively sharp negative impulses to a display counter 132. Of course, the purpose of counter 132 is to give a visual count which indicates the length of light band 74 and therefore the size of the measured zone of inhibition. Thus, if desired, the system may terminate at this point with the counter giving the final read-out. However, since it is highly desirable to provide the measurements in a more permanent form which does not require the operator to read and record each individual measurement, the system preferably includes a signal convertor 134 which may operate a printer 136 and/or a tape punch mechanism 138. In the preferred embodiment illustrated in FIGURE 6, a manual switch 140 is positioned between the counter and the convertor so that the operator may select either the visual indication alone or the visual indication plus a permanent record. In addition, two further switches 142 and 144 are provided at the output of the convertor so that the operator may selectively operate either or both the printer and tape punch mechanism. If it is merely desired to produce the measurements in a permanent recorded form, printer 136 will be sufficient and, as well known, such printers provide a paper tape having a numerical output printed thereon. On the other hand, it may be desirable to provide the output measurements in the form of a punched tape which may then be fed into a computer for analyzing the results of thousands of measurements at a more rapid rate. Thus, it will be apparent that the preferred system is fully compatible with conventional read-out instruments and that it provides a plurality of selectable forms in which the final output may be obtained.

The operation of the entire system is as follows. The operator first closes master switch 118 whereby the indicator light 120 and projecting lamp 22 are illuminated and the power supply convertor 116 supplies the proper operating voltages to each of the components in the read-out portion of the system as well as activating phototube 112. The operator then places the petri dish 10 on shelf 36 and aligns one zone of inhibition with respect to aperture 34 so that this zone is properly illuminated. At this time, the carriage 89 is in its lowermost position so that it engages normally open switch 94 and thereby prevents energization of motor 96. However, as soon as the culture is properly positioned as just described, the operator depresses either one of momentary switches 122 or 124, it being remembered that switch 124 is an auxiliary foot-operated switch. Upon closure of either of these momentary switches, either by hand in the case of switch 122 or by the operator's foot in the case of switch 124, motor 96 is energized and begins to rotate crank 102 so as to move out of its bottom, dead center position thereby starting to raise the carriage 89. As soon as this assembly moves upwardly a slight amount, normally open switch 94 is released and closes so that a holding circuit is established through this switch which continues to energize the motor throughout one revolution of crank 102. At the end of one revolution of the crank, the carriage 89 again engages switch 94 so that the motor is automatically deenergized, the momentary switches having been reopened immediately upon closure of switch 94.

During each such cycle of operation, scanning tube 92 is moved vertically along the length of light band 74 and immediately adjacent thereto so that each increment of light is successively projected through slit 110 and sensed by phototube 112. In turn, the phototube generates an electrical output pulse each time it receives a pulse of light from each individual increment of the light band so that the number of output pulses from the phototube is a measurement of the length of the band. Of course, the pulses cease as soon as the scanning tube has moved beyond the upper end of band 74 and are repeated during the downward movement of the tube until the latter has moved beyond the lower end of the band so that the count number represents twice the total number of increments. In turn, the length of the band is preferably three times the actual diameter of the zone of inhibition so that the actual diameter is effectively enlarged six times, whereas, the maximum degree of error is limited to the width of one increment between a pair of lines 72 and this is in the order of five thousandths of an inch or less. Of course, the read-out components may produce the output in terms of counts or they may be calibrated to read-out in terms of inches, centimeters or any other convenient units of measurement.

Upon the completion of one cycle as just described, the operator then moves a new culture into alignment with aperture 34 and the system is again ready to take a measurement in the same manner as previously described. As a result, the instrument may be easily operated by a totally unskilled person since the sole functions of the operator are to align the individual cultures and to close one or both of the momentary switches 122 or 124.

From the foregoing description it will be readily apparent that the invention, although particularly adapted for measuring zones of inhibition, is in no way limited to such use and that numerous modifications and alterations may be made therein without departing from the scope of the invention as hereinafter defined in the following claims.

What is claimed is:
1. A system for indicating the size of an annular transparent zone on an otherwise opaque surface comprising, means for producing an annular image of light the outer diameter of which is proportional to the outer diameter of said zone, means for converting said annular image into an elongated and narrowed linear image the length of which remains proportional to the outer diameter of said zone, means for dividing said linear image into a plurality of alternate light and dark segments along the length of said linear image, light-sensitive means mounted for movement along a line parallel and adjacent to the length of said linear image for scanning said segments, and means connected to said light-sensitive means for producing an output signal indicative of the size of said zone.

2. A system for automatically measuring the outer diameter of an annular, translucent zone having opaque means forming its boundaries comprising; means for projecting light through said zone for forming an annular image, the outer diameter of which is proportional to the outer diameter of said zone, means for converting said annular image into an elongated and narrowed linear image the length of which is proportional to said diameter, light-sensitive scanning means for measuring the length of said linear image, and means connected to the output of said light-sensitive scanning means for producing a signal indicative of the magnitude of said outer diameter.

3. A system for measuring and indicating the outer diameter of an annular transparent zone on an otherwise opaque surface comprising, means for producing a magnified image of said zone, means for converting said image into an elongated linear image the length of which is proportional to said outer diameter, light-sensitive scanning means for measuring the length of said linear image, and means connected to the output of said light-sensitive scanning means for producing a signal indicative of the magnitude of said outer diameter.

4. An electro-optical system for measuring and indicating the size of an annular, transparent zone on an otherwise opaque surface comprising, a light source, means for projecting light from said source through said zone for producing a projected image of said zone having an outer diameter proportional to the outer diameter of said zone, an optical train including a cylindrical lens for converting said projected image into an elongated and narrowed linear image the length of which is proportional to the outer diameter of said zone, electro-optical means for measuring the length of said image, and means connected to said measuring means for indicating the size of said zone.

5. The system as claimed in claim 4 wherein said electro-optical measuring means include a phototube for scanning said image and producing an electrical signal indicative of the length thereof.

6. The system as claimed in claim 5 wherein said image is projected onto a translucent member having a series of non-translucent portions dividing said image into a series of increments along the length of said image, said phototube sensing the number of said increments comprising said image and producing an output signal indicative thereof.

References Cited by the Examiner
UNITED STATES PATENTS

| | | | |
|---|---|---|---|
| 2,481,310 | 9/1949 | Hutchinson et al | 88—14 |
| 2,498,030 | 2/1950 | Davis | 88—14 |
| 2,854,888 | 10/1958 | Kaye | 88—28 |
| 2,938,126 | 5/1960 | Adler | 88—14 |
| 3,102,203 | 8/1963 | Ingber. | |

FOREIGN PATENTS 1,035,812    4/1953    France.

JEWELL H. PEDERSEN, *Primary Examiner.*